2,784,094

PROCESS OF INCREASING THE DIGESTIBILITY OF STARCH CONTAINING POTATOES AND CEREALS

William Lyle Sives, Bakersfield, Calif.

No Drawing. Application April 28, 1950,
Serial No. 158,919

5 Claims. (Cl. 99—10)

This application relates to processes of partially hydrolyzing starch in food materials in order to increase the digestibility of the starch carbohydrate and to food materials processed by my invention.

Starch carbohydrate material for ingestion must be "broken down" for greater digestibility and the more extensively such disintegration is carried out the greater the availability to attack by the enzymes of the digestive fluid.

Starch carbohydrate is known to consist of molecules of high molecular value and is composed of two components, amylose and amylopectin. The molecular structure of the amylose component is a long chain like structure of glucopyranose units connected together in alpha 1,4-glucosidic bond linkage. These chains are considered to be some 100 to 700 glucoside units in length (according to the specie of the starch) terminating with "reducing" and "non-reducing" ends.

The amylopectin, also a polysaccharide, is a "branch-like" structure of 50 to 70 branches composed of glucopyranose units. The "branches" are from 25–30 units in length bonded together in the glucosidic bond linkage of aplha 1,4-position and is considered attached at the junction point of the branches in alpha 1,6-bond linkage. The branches terminate in "non-reducing" ends and with one reducing end exposed in the branched structure.

The molecular structure of the amylopectin component is considered to be 500 to 2000+ glucosidic units (according to the specie of the starch).

It is known that the alpha and beta amylase enzymes are the principal factors in the biochemical digestion of starch molecules. These enzymes function with certain definite end products. It has been shown that beta amylase digests the amylose starch component by commencing at the "non-reducing" ends and "scissors off" in pairs of glucose units to form maltose to final digestion of the amylose to maltose.

It also has been shown that beta amylase digests the amylopectin starch fraction also commencing at the "non-reducing" ends of the "branches" and "scissors off" maltose in pairs of glucose units until it approaches the junction point of the branches and there is ceases because it cannot effect cleavage of the alpha 1,6-bond linkage. It therefore leaves a glucosan residual of large molecular weight. 57 to 60% of the amylopectin is digested by the beta amylase. The thus remaining portion is called the "limit dextrin.' However, the alpha amylase enzyme cleaves the starch molecule also at the alpha 1,4-glucosidic linkage but encompasses units comprising 6–7 glucosides, thereby forming glucosans of high molecular weight. It forms very little glucose and maltose. The residual products of the alpha amylase cleavage are neither glucose nor maltose but are glucosans in which are included glucosans comprising the greater extent of junction point sections of the branch structure and included in these are glucosans such as isomaltose, tri- and tetra-saccharides containing alpha 1,6-glucoside linkage.

In soluble starch solutions the alpha amylase progression after its dextrinogenic phase then continues into a saccharogenic phase of reducing sugar formation. From 30 to 75% conversion is effected according to the species of the amylase.

Therefore, with both alpha and beta amylase active in biochemical amylolytic metabolism there still are left per amylopectin component, glucosans containing an alpha 1,6-glucosidic linkage which the amylases do not convert to glucosides of digestible saccharidic values. While these glucosans may be reducing, having exposed glucosidic ends, they represent an unfermentable portion of the amylopectin molecular structure and are indigestible by the alpha and beta amylase of biochemical reactions.

The object of my invention is to increase the digestibility of the starch molecules in starch containing food materials.

A further object of my invention is to effect a partial hydrolytic cleavage of the starch molecules.

A further object of my invention is to convert a portion of the glucopyranose structures in starch containing food materials by random hydrolysis to glucosans of various lower molecular weights and to convert indigestible saccharides to glucosans and digestible saccharides.

A further object of my invention is to partially convert the starch to glucosans of lower molecular structures with the thereby accompanying increase of greater dispersal and cross-sectional area exposure to the fluids of the biochemical system.

A further object of my invention is to increase the digestibility, palatability and nutritional values of the starch constituents of raw foods.

A further object of my invention is to obtain a product which may be used as a main dietary of carbohydrate values.

A further object of my invention is to provide a process which may be used to convert starch containing surplus foods, as well as others, such as potatoes, which in their raw state are indigestible by carnivorous and omnivorous systems to food materials which are digestible by such systems. For example, which can be converted to satisfactory food materials for swine, dogs, cats, rabbits, poultry, fowl, etc.

A further object of my invention is to provide a product of surplus materials, such as potatoes, which has the same or greater nutritional values as untreated grains and may be substituted for untreated grains.

A further object of my invention is to increase the solubility of the starch carbohydrate so that more of the treated starch carbohydrate can be assimilated with the same amount of water.

My invention has many other objects, advantages, and features which will be apparent from the following description in which I shall describe certain forms of my invention for illustrative purposes only.

My process is particularly useful in the preparation of foods for invalids and infants. This is due to the fact that food prepared by my process is rendered more digestible, more nutritious and more palatable.

Some of the materials for human consumption which may be processed by my invention are: pearl barley and barley; corn meal; corn flour; macaroni type products; flour; oatmeal biscuits; fillings used for puddings, pastries and custards; custard powder; pancake and waffle flour; potatoes including potato chips and potato flakes; corn; hominy; cerials and cereal grains; gruels; tapioca; baby foods; bananas; beans and peas; rice; yams; lentils; arrow root; and oats.

Some of the animal food materials which may be processed by my process are all uncured starch containing grains, such as wheat, barley, oats and rye, green and dried corn, cassava roots and similar starch-containing roots and tubers, lily bulbs, potatoes, yams, beans and peas (starch-containing species) and acorns. In fact, my process is applicable to increase the digestability of all starch-containing vegetative matter.

Briefly, my process comprises a physical disintegration of starch carbohydrate vegetatibe matter, exposure of the interior cellulose structure with partial release of starch granules from the cellulose bound starch cells, a chemical or enzymatic, and in some instances continued by thermal, partial disintegration of the starch granule, and partial disintegration of the starch molecule itself.

The raw material is washed and either ground, chopped or diced, depending upon the material and the particular process to be used. It is usually more expedient to chop or crush a green material rather than grind it, and it is usually more expedient to grind or more finely disintegrate a dry material rather than chop or crush it.

The hydrolytic cleavage may be effected by the use of acids, bases, basic salts and/or micro-biological amylase (diastase) enzymes.

Some of the acids which may be used are: hydrochloric; nitric, sulphuric; phosphoric; sulphurous; and tartaric acid. However, I prefer to use nitric acid in combination with one of the other acids.

Some of the bases which may be used are: sodium hydroxide; potassium hydroxide; and calcium hydroxide.

Some of the basic salts which may be used are: sodium carbonate; potassium carbonate; trisodium phosphate; tripotassium phosphate; sodium silicates ($Na_2SiO_3$, $Na_6Si_2O_7$ and $Na_2Si_3O_7$); and potassium silicates ($K_2SiO_3$, $K_6Si_2O_7$ and $K_2Si_3O_7$). However, I prefer to use the basic salts in combination with a base.

Some of the diastatic micro-biological enzymes which may be used are those of micro-organism origin, such as: *Aspergillus oryzae*; *Aspergillus niger*; *Bacillus mesenthericus*; and *Bacillus subtilis*.

The dinsintegrated or chopped raw material is treated with an acid, base, basic salt or diastatic enzyme for a sufficient period of time to effect substantial hydrolytic cleavage of the starch molecules, without forming undesirable excessive amounts of reducing sugars. With the use of enzymatic catalysts a pretreatment with an alkali is preferred in order to increase the starch solubility.

Various predetermined temperatures are used while the raw material is being treated with the acid, base, basic salt, or enzyme, which temperatures are relative to the specie of the starch granule and its few granule swelling temperature. Although temperatures exceeding the few granule temperature may be used, I prefer to use temperatures during that step which do not cause the starch granules to swell excessively. The reasons for my preference are:

(1) By the use of temperatures at or below the few granule swelling temperature desirable hydrolytic cleavage compounds are obtained, which compounds cannot be obtained in the desired quantities at temperatures in excess of the few granule swelling temperature while the material is being treated with the catalyst;

(2) Undesirable excessive solution of the amylose is not effected;

(3) At temperatures in excess of the gelatinizing temperatures undesirable increases in viscosity are produced;

(4) It is very difficult to separate the fluid from the treated material if temperatures in excess of the few granule swelling temperature are used. For example, the liquid cannot be separated in the desired quantities from the treated material by centrifuging.

These temperatures for some of the raw materials are given by Thorpe's Dictionary of Applied Chemistry (1926 Edition) as follows:

| Kind of Starch | Few Granules Swollen at C.° | Majority Granules Swollen at C.° | All Granules Swollen at C.° |
|---|---|---|---|
| Potato | 55 | 60 | 68 |
| Cassava | 58 | 63 | 68 |
| Natal | 58 | 65 | 70 |
| Wheat | 60 | 65 | 70 |
| Tous-les-mois | 65 | 68 | 72 |
| Bermuda | 62 | 69 | 73 |
| Sago | 64 | 68 | 74 |
| Maize | 65 | 70 | 77 |
| Oat | 65 | 70 | 77 |
| St. Vincent | 66 | 73 | 77 |
| Rice | 70 | 74 | 80 |

In dilute caustic alkali solutions starch gelatinizes at temperatures below that which starch gelatinizes in water. However, starch products treated with dilute caustic alkali for the periods of time required in the hydrolyte by my process at temperatures below the gelatinizing temperature of starch in water do not exactly resemble starch treated at temperatures above the gelatinizing temperature of starch in water, in that the starch in dilute alkali solutions does not form the viscous mass that is formed when starch is treated in water at temperatures at or slightly above the gelatinizing temperature. In particular, this is true in those instances in which the starch is contained in vegetative matter.

If the product is for human consumption, the pH of the finished product should be between approximately pH 5.4 and pH 7.9. If the product is for animal feeding, the pH of the finished product should be between approximately pH 4.2 and pH 7.9.

In some instances in the treatment of food materials with certain acids, for example, hydrochloric acid, I have found that the pH of the materials did not have to be adjusted for dietary purposes in that the pH of the finished products were within the desired range without any pH adjustment whatever.

The material may be neutralized to the desired extent in the treating tank or after its removal from the treating tank and before it is dehydrated, or later in the process. In some instances the pH of the mass was adjusted in the treating tank to come within the range of pH 5.4 to pH 6.5. In other instances, the pH of the material was not adjusted before dehydration for reasons which will be evident hereinafter.

Various chemicals can be used to effect the pH adjustment, depending upon the result desired. For example, if phosphoric acid is used as the catalyst and sodium phosphate is desired, the pH adjustment can be effected by the use of sodium hydroxide, and in those instances in which calcium phosphate is desired, the pH adjustment can be effected by the use of calcium hydroxide. Obviously sodium chloride can be produced in the product by the use of hydrochloric acid and sodium hydroxide.

After treating the raw material with the chemical or enzyme, the treated material may be transferred to a centrifuge to separate most of the treating fluid, and then transferred to a dehydrator or sun-dried. The dehydrator is operated at such temperatures and the material maintained in the dehydrator for such period of time as are necessary to effect such further disintegration of the starch molecule, as may be desired, and to reduce the moisture content of the material to approximately 8% to 12%, depending upon the material treated, its moisture equilibrium value, and the final product desired.

If the material is acidic and below pH 5.4, or if the material is alkaline and above pH 8.6, and the moisture content is not too low, temperatures below 100° C. effect some further hydrolytic cleavage and considerable further hydrolytic cleavage is effected at temperatures of approximately 100° C. and above, particularly in those instances in which the material is maintained at elevated temperatures for a considerable period of time. If the material is between pH 5.4 and pH 8.6, practically no further hydrolytic cleavage is effected in the dehydrator. In general, if the pH of the material in the dehydrator is below 5.4, the more acidic the material is, or if the pH of the material in the dehydrator is above pH 8.6, the more alkaline the material is, the higher the temperature of the dehydrator, and the longer the material is maintained in the dehydrator, provided that the moisture content of the material is not too low, the greater the additional hydrolytic cleavage that will be effected in the dehydrator.

The degree of hydrolytic cleavage effected in the dehydrator may be controlled by regulating the pH or the moisture content of the material, or the dehydrating time or the temperature of the dehydrator so that not in excess of the desired amount of reducing sugars and reducing sugars of hydrolytic residuals are produced.

In a modification of my process, instead of transferring the treated material to a centrifuge the treated material is transferred to a steam chamber where further hydrolytic cleavage is effected, after which the material may be dehydrated, depending upon the use of the product.

In my process the starch molecules of the raw materials are partially hydrolyzed to high and low molecular glucosans, and reducing sugars such as maltose and dextrose, primarily such as are produced in the hydrolytic cleavage of starch molecules at temperatures below the gelatinizing temperature of the starch, and such hydrolytic cleavage products as are produced in the dehydrator or steam chamber.

The glucopyranose structures are converted by random hydrolysis to glucosans of various lower molecular weights, and indigestible saccharides are converted to glucosans of lower molecular weight and digestible saccharides. In other words, by use of my process, starch is partially converted to glucosans of lower molecular structure with the thereby accompanying increase of greater dispersal and cross-sectional area exposure in order to render the treated material more susceptible to the fluids of the biochemical system.

In all instances, the starch of the treated vegetative matter was more soluble in water and less viscous in water than the starch in the same, but untreated vegetative matter. This increase in solubility and decrease in viscosity is due to the hydrolytic cleavage and exposure of the starch molecules.

In my process, large amounts of reducing sugars, that is, amounts in excess of 20%, are undesirable for the reason that in such instances large amounts of starch are converted to another product, whereas the object of my invention is merely to increase the digestibility of the starch molecules. The fact that reducing sugars are formed at the expense of the hydrolyzed starch is merely incidental. Another reason why large amounts of reducing sugars are undesirable in my process is that the product of my invention is for use as a main dietary of carbohydrate values and could not be used as such if the product contained excessive amounts of reducing sugars.

One of the main advantages of my process is that it can be used to treat food materials to render them digestible by certain animals which cannot asimilate the untreated food materials.

For example, practically no untreated or uncooked potatoes in their natural state can be assimilated by swine. Cooked potatoes can only be fed to swine as a dietary supplement. This is also true of dehydrated potatoes, although the maximum of dehydrated potatoes that can be fed to swine is somewhat higher than cooked potatoes, but even dehydrated potatoes can only be used as a dietary supplement.

Potatoes treated in accordance with my invention have been successfully fed as the main carbohydrate diet to swine. In fact, the treated potatoes comprised 80% of the total food consumed by the swine. No grains whatever were fed to the swine. The only other food fed to the swine was a supplementary food consisting mainly of proteins and minerals, although the supplementary food also contained carbohydrate values.

Another advantage of my process is that the nutritional values of the treated food material are greatly increased. Less treated food material is required than that of untreated raw food material to maintain normal growth. The product of my invention contains increased nutritional values with respect to untreated starch carbohydrate food materials.

In a compilation made of the results of over 500 American feeding experiment stations, an average of 454.25 pounds of feed (grains and supplements) were required to produce each 100 pounds gain by swine of various weights from 50 to 250 pounds.

A similar test of swine through similar growing weights was made with the main diet consisting of 80% by weight of potatoes processed by my invention, together with 7% of dehydrated alfalfa and 13% of protein and mineral-containing supplements. A total of 343 pounds of feed were required to produce each 100 pounds of gain. In other words, 111.25 pounds less of potatoes processed by my invention and the food supplement used were required to make 100 pounds of gain or a total of 24.47 percent less feed was required than that required by grain and other supplements. The meat of the potato fed swine was of exceptional quality and compared favorably to grain fed pork. In addition, the carcasses dressed out 14% better than average.

Another advantage of my process is that the palatability of the food material is greatly enhanced. This is due to the formation of reducing sugars in the hydrolytic cleavage of the starch molecule, the tart flavor imparted by the acid treatment, and the formation of salts during the process.

The molecular hydrolytic cleavage of the amylose and amylopectin fractions of starch may be quantitatively determined by a potentiometric analysis. The method and procedure that I have used and followed is that standardization described by F. Leslie Bates, Dexter French and R. E. Rundel in the J. A. C. S., vol. LXL at page 142.

This standardization is based on the fact that amylose and amylopectin are quite distinct in their reaction with iodine to form iodine complexes. The affinity for iodine varies inversely with the degree of branching of the starch chain of the amylopectin, and the affinity for iodine varies directly with the length of the starch chain of the amylose. The greater the increase of hydrolytic cleavage of the amylose fraction, the greater will be the increase of potential. The greater the increase of hydrolytic cleavage of the amylopectin component, the greater will be the decrease in potential. For example, when the reaction of iodine to the amylose fraction is complete, the continued reaction of the amylopectin is then observed and denoted by an increase of potential in the analysis. The point of inflection, that is, the point at which the reaction of iodine with the amylose fraction is complete, is determined by tabulating and plotting the iodine titration potential differentials.

In other words, absorption accounts for practically all the iodine bound by amylose, and the amount of iodine involved in complex formation with the amylopectin may be determined by finding the intersection of the absorption curve with the vertical line representing the complex formation.

Therefore, relative hydrolytic cleavage values of the amylose and amylopectin components of the starch molecules may be obtained and computed by an analytical geometric function, and expressed in relative area potential.

The relative area potential of the amylose is indicative of the length of the amylose chains and the relative area potential of the amylopectin is indicative of the degree of branching and length of the amylopectin chains, in respect to iodine affinity.

In all instances, titrations were made with 0.001 normal iodine, and successive additions of 1 cc. of iodine were made until 24 ccs. of iodine had been added.

The relative area potential indicative of the length of the amylose chains may be approximately determined by the following formula:

$$RpA = x_1 + x_2 + x_3 + \ldots + x_{n-1} + \tfrac{1}{2}x_n + \tfrac{1}{2}(x_n + x_y) \text{ times } f$$

Where $RpA$ = relative area potential of amylose all of the potential increases are expressed in millivolts.

$x_0$ = potential reading at the starting point, that is, before the addition of any iodine.

$x_1$ = potential increase over $x_0$ after the addition of 1 cc. of iodine.

$x_2$ = potential increase over $x_0$ after the addition of 2 cc. of iodine.

$x_3$ = potential increase over $x_0$ after the addition of 3 cc. of iodine.

. . . (represent potential increases over $x_0$ after successive additions of 1 cc. of 0.001 normal iodine, other than those represented by $x_1$, $x_2$, $x_3$, $x_{n-1}$ and $x_n$).

$x_{n-1}$ = potential increase over $x_0$ after the addition of the next to last full cc. of iodine added before point of inflection is reached.

$x_n$ = potential increase over $x_0$ after the addition of the last full cc. of iodine added before point of inflection is reached, except in those instances in which the point of inflection occurs upon the addition of a full cc. of iodine, in which instances $x_n$ is the potential increase over $x_0$ at the point of inflection.

$x_y$ = the potential increase over $x_0$ at the point of inflection in those instances in which the point of inflection occurs between the addition of successive ccs. of iodine, and $f$ = a fraction equal to the fractional part of a cc. of iodine added to reach the point of inflection after the addition of the last full cc. prior to reaching the point of inflection.

Obviously, in these instances in which the point of inflection occurs upon the addition of a full cc. of iodine, $f = 0$.

In those instances in which the point of inflection occurs upon the addition of a full cc. of iodine, the relative area potential of the amylopectin may be approximately determined by the following formula:

$$RpA = y_1 + y_2 + y_3 + y_4 + y_5 + y_6 + y_7 + y_8 + y_9 + \tfrac{1}{2}y_{10}$$

Where $RpA$ = relative area potential of amylopectin all of the potential increases are expressed in millivolts.

$y_1, y_2, y_3, y_4, y_5, y_6, y_7, y_8, y_9$, and $y_{10}$ = potential increases over reading at point of inflection after successive additions of 1 cc. of iodine, respectively. For example, $y_{10}$ is the potential increase over the reading at the point of inflection after the addition of 10 ccs. of iodine added after the point of inflection was reached.

In the event that the point of inflection occurs between the addition of successive ccs. of 0.001 normal iodine, the relative area potential of the amylopectin may be approximately determined by the following formula:

$$RpA = z_1 + z_2 + z_3 + z_4 + z_5 + z_6 + z_7 + z_8 + z_9 + \tfrac{1}{2}z_{10} + \tfrac{1}{2}(z_{10} + z_z) \text{ times } f - \tfrac{1}{2}z_1 \text{ times } f$$

Where $RpA$ = relative area potential of amylopectin all of the potential increases are expressed in millivolts.

$z_1, z_2, z_3, z_4, z_5, z_6, z_7, z_8, z_9$, and $z_{10}$ = potential increases over reading at point of inflection after successive additions of 1 cc. of iodine, respectively, after the addition of last full cc. of iodine added prior to reaching the point of inflection.

$z_z$ = potential increase over reading at point of inflection after addition of 10 ccs. of iodine added after reaching point of inflection. This increase is obtained by interpolation.

$f$ = a fraction equal to the fractional part of a cc. of iodine added to reach the point of inflection after the addition of the last full cc. prior to reaching the point of inflection.

For example, in Example A which is set forth hereinafter, the amylose and amylopectin values of the treated yellow corn were determined by this method. From the following data, by use of the foregoing formulas, the relative area potential values of the amylose and amylopectin were determined to be 700.31 and 114.19, respectively:

*Example A*

| 0.001 Normal Iodine Added in cc. | Potential Reading in Millivolts | Symbol Used in Formula | Potential Increase over $x_0$ Expressed in Millivolts |
|---|---|---|---|
| 0 | 136 | $x_0$ | 0 |
| 1 | 157.5 | $x_1$ | 21.5 |
| 2 | 173.5 | $x_2$ | 37.5 |
| 3 | 185 | $x_3$ | 49 |
| 4 | 197 | $x_4$ | 61 |
| 5 | 207.5 | $x_5$ | 71.5 |
| 6 | 216 | $x_6$ | 80 |
| 7 | 230 | $x_7$ | 94 |
| 8 | 242.5 | $x_8$ | 106.5 |
| 9 | 247.5 | $x_{n-1}$ | 111.5 |
| 10 | 249 | $x_n$ | 113 |
| 10.1 [1] | 249.25 | $x_y$ | 113.25 |
| 11 | 251.5 | $z_1$ | 2.25 |
| 12 | 256.5 | $z_2$ | 7.25 |
| 13 | 259 | $z_3$ | 9.75 |
| 14 | 259.5 | $z_4$ | 10.25 |
| 15 | 260 | $z_5$ | 10.75 |
| 16 | 262 | $z_6$ | 12.75 |
| 17 | 264.5 | $z_7$ | 15.25 |
| 18 | 265 | $z_8$ | 15.75 |
| 19 | 268 | $z_9$ | 18.75 |
| 20 | 268.5 | $z_{10}$ | 19.25 |
| 20.1 [2] | 268.6 | $z_z$ | 19.35 |
| 21 | 269.5 | | |
| 22 | 271 | | |
| 23 | 272 | | |
| 24 | 272.5 | | |

[1] Point of Inflection obtained by plotting and interpolation.
[2] Obtained by interpolation.

As stated above, the affinity for iodine varies conversely in relationship to the relative area potential values of the amylose and amylopectin. Therefore, in determining the relative hydrolytic cleavages of the starch molecule the $RpA$'s of the two components must be computed separately. However, the relative total hydrolytic cleavage area potentials of the two components of the starch molecules with respect to the amylose and amylopectin values of any untreated starch, may be computed by use of the following formula:

$$R.C.V. = (C - A) + (B - D)$$

Where

R. C. V. = relative total cleavage values of the treated starch.

$A = RpA$ of the amylose component of the untreated starch.

$B = RpA$ of the amylopectin component of the untreated starch.

$C = RpA$ of the amylose component of the treated starch.

$D = RpA$ of the amylopectin component of the treated starch.

For example, in Example No. 1, the $RpA$'s of the amylose and amylopectin in the treated potatoes were 610 and 200.5, respectively. In Example No. 3, the RpA's of the amylose and amylopectin of the untreated potatoes were 169.13 and 223.4, respectively. The relative cleavage value of the treated potato was found to be 463.77:

R. C. V. = (610−169.13)+(223.4−200.5) = 463.77

In addition to the standard potentiometric method of analysis, the relative molecular hydrolytic cleavage values in certain examples was determined by standard colorimetric methods.

The values obtained by the colorimetric tests confirmed the results obtained by the potentiometric analysis.

The color changes as the hydrolytic cleavage progressed were from the characteristic sapphire blue of untreated starch, to violet, purple and in those instances in which the hydrolytic cleavage continued to that extent, to a blue of close resemblance to that of untreated starch.

Thus, my hydrolytic cleavage values differ from those in which the hydrolytic cleavage is carried out to the higher saccharidic values of reducing sugars, such as in the manufacture of glucose. In the manufacture of glucose, as the hydrolytic cleavage progresses, the color sequences are from sapphire blue, to violet, purple, rose red, reddish brown, to clear. In the manufacture of some adhesives and gums, as the hydrolytic cleavage proceeds at temperatures in excess of the gelatinizing temperature of the starch, the color sequences are from sapphire blue, to violet, purple, to rose red.

In each of the following examples, Nos 1-20, inclusive, an analysis of the starch values, reducing sugars and dextrins, and the amylose and amylopectin relative area potential values was made on a moisture-free basis. In each instance the analysis included the carbohydrate values in solution in the water of extraction. The relative cleavage value of the treated materials was also computed.

Examples 1 and 2 are examples of the use of my process to treat raw white potatoes. The potatoes in Example No. 3 were not processed by my invention, but this example was made for purposes of comparison. Raw white potatoes from the same lot were used in each example.

The results of Examples 1, 2 and 3 are given in the Table A following Example No. 3. As stated above, potatoes processed in accordance with Example No. 1 were fed to swine. Potatoes processed by the process described in Example No. 2 are suitable for both human consumption and animal feeding, and potatoes processed by the process described in Example No. 1 are suitable only for animal feeding in that the pH was not adjusted.

*Example No. 1*

1500 pounds of raw white potatoes were washed and passed through a dicing machine and reduced to cubes approximately ⅜ inch per side. The thus chopped potatoes were accumulated in a tank containing 250 gallons of water. The fluid in the tank was continuously mixed by means of a circulating pump while the mass was in the tank.

96 liquid ounces of commercial hydrochloric acid (31.5%HCl, 20 Bé.) was added to the tank to obtain an equivalent pH 3.3 at 25° C. after twenty minutes. 30 pounds pressure steam was then sparged into the tank and the temperature was raised to 55° C. which temperature was maintained for a period of two hours.

The treated potatoes were then removed by a mechanical elevator and transferred to a twelve inch moving belt enclosed in metal with the "feed-in" and the "feed-out" ends enclosed by flexible flaps. The length of the belt line between flaps was thirty feet. Located within the enclosure and approximately two inches above the belt and running parallel four inches apart the full length of the belt were two ¾″ steam pipes with 5/16″ orifices in staggered position approximately one inch apart. Steam at 30 pound pressure was then sparged down and through the diced potatoes. The temperature of the potatoes on the moving belt was maintained at approximately 108.8° C. the belt moved at a rate of four feet per minute which gave a steam contact time of seven and one-half minutes. The potatoes fell out of the feed-out end of the belt line into a bin. The pH of the treated potatoes was equivalent to pH 4.2 at 25° C. The potatoes were then sun-dried for a period of forty-eight hours. The average moisture content of the sun-dried potatoes was found to be 10.28%.

Instead of sun drying the treated potatoes the potatoes may be dehydrated in a mechanical dehydrator to approximately the same extent. The pH value of the processed potatoes could have been adjusted to pH 5.4 or slightly greater in which event they would have been suitable for human consumption, preferably with culinary treatment.

The following is applicable in those instances in which the material is sun-dried. If the treated material is for human consumption and the pH of the material from the steam chamber is below pH 5.4 or greater than pH 7.9 the pH of the treated material should be adjusted to between approximately pH 5.4 and pH 7.9. If the treated material is for animal feeding the pH of the material is below pH 4.2 or greater than pH 7.9, the pH should be adjusted to between approximately pH 4.2 and pH 7.9. If the treated material is too acid the desired pH may be effected by spraying a dilute solution of sodium carbonate, or other alkaline material (depending upon the salt desired) just before the material passes out of the steam chamber, as it passes out of the steam chamber, or after the steam chamber treatment. If the treated material is too alkaline the desired pH may be effected by spraying a dilute solution of hydrochloric acid, or other acid material (depending upon the salt desired) at the steps in the process indicated above.

*Example No. 2*

1500 pounds of raw white potatoes were treated in the same manner as described in Example No. 1, except that the potatoes were transferred from the acid treating tank by a mechanical elevator to a dehydrator instead of being conveyed to a moving belt for treatment in the steam chamber. The potatoes were in the dehydrator for approximately seventy minutes and the dehydrator was maintained at 100° C. The moisture content of the dehydrated potatoes was determined and found to be approximately 10%.

*Example No. 3*

100 pounds of raw white potatoes were treated in the same manner as Example No. 1, except that no acid was added to the mass.

TABLE A

|  | Example No. 1 | Example No. 2 | Example No. 3 |
| --- | --- | --- | --- |
| Starch Content_____percent__ | 74.900 | 74.857 | 78.212 |
| Reducing Sugars and Short Chain Dextrins_____percent__ | 5.904 | 5.95 | 2.22 |
| Total Carbohydrates_____do____ | 80.800 | 80.805 | 80.432 |
| Amylose RpA_____ | 610.0 | 612.5 | 169.13 |
| Amylopectin RpA_____ | 200.5 | 199.4 | 223.4 |
| R. C. V._____ | 463.77 | 467.37 | _____ |

Examples Nos. 5, 6, 7, 8 and 9 are examples of the use of my invention to increase the digestibility of air-dried yellow corn. The yellow corn in Example No. 4 was not processed by my invention, but this example was made for the purposes of comparison. Yellow corn from the same lot was used in each example, and in each example the corn was ground in a Buhr stone mill to pass through a sieve having 4 mm. openings. The results of these examples are given in the Table B following Example No. 9. The products of Examples Nos. 5, 6, 7, 8 and 9 are suitable for both human consumption and animal feeding.

*Example No. 4*

12½ pounds of air-dried and ground yellow corn was added to a vessel containing 2.8 gallons of water. The yellow corn was continuously mixed while in the vessel by means of a mechanical mixer and a circulating pump. The temperature of the corn mash was raised to 63° C. and maintained at that temperature for a period of ninety minutes. The corn mash was then pumped to a centrifuge and the excess water extracted. The centrifugate was then transferred to a dehydrator maintained at 60° C. for a period of ninety-five minutes. The mass was then transferred from the dehydrator and it was determined that the moisture content had been reduced to 12.70%.

*Example No. 5*

12½ pounds of the same air-dried and ground yellow corn was added to a vessel containing 2.8 gallons of water. The corn mash was continuously mixed while in the vessel. 7.334 liquid ounces of ⅕ strength commercial hydrochloric acid (31.5% HCl, 20° Bé.) was slowly added to the mash to obtain a pH 3.29 at 25° C. after twenty minutes. The temperature of the mash was then raised to 63° C. This temperature was maintained for a period of ninety minutes. The pH of the mash was then checked and found to be equivalent to pH 3.45 at 25° C. An adjustment equivalent to pH 5.4 at 25° C. was made with the addition of 6 normal sodium hydroxide. The mash was then transferred to a centrifuge to reduce the liquid content. The centrifugate was then transferred to a dehydrator maintained at 60° C. for a period of ninety-five minutes. The corn meal was then removed from the dehydrator and it was determined that the moisture content of the corn meal had been reduced to 12%.

*Example No. 6*

12½ pounds of the same air-dried and ground yellow corn was treated in the same manner as described in Example No. 5, except that the pH was not adjusted before the mash was transferred to the centrifuge and that the corn meal was treated in the dehydrator for a period of thirty minutes and the dehydrator was maintained at a temperature of 100° C. The moisture content of the dehydrated corn meal was approximately 12% and the pH of the treated corn meal was approximately pH 6.0.

hydrator maintained at 100° C. for a period of thirty minutes. The corn meal was then removed from the dehydrator and it was determined that the moisture content of the thus treated dehydrated corn meal had been reduced to 12.71%. The pH of the corn meal was then adjusted with dilute hydrochloric acid to approximately pH 6.5. The corn meal was again dehydrated until the moisture content was approximately 12%.

*Example No. 8*

10 pounds of the same air-dried and ground yellow corn was added to a vessel containing 3.4 gallons of water. 4.92 ounces of 6 normal sodium hydroxide was added to the corn mash to obtain a pH 10.7 at 25° C. after twenty minutes. The corn mash was continuously mixed by means of a mechanical mixer and a circulating pump while the sodium hydroxide was being added over the twenty minute period to the mash. At this point the mixer and pump were stopped and the mash was allowed to macerate for a period of seventy-two hours, during which an average temperature of 25° C. was maintained. The mash was then transferred to a centrifuge to reduce the liquid content. The centrifugate was transferred to a dehydrator maintained at 100° C. for a period of thirty minutes. The corn meal was then removed from the dehydrator. The pH of the corn meal was then adjusted with dilute hydrochloric acid to approximately pH 6.5. The corn meal was then dehydrated until the moisture content was approximately 12%.

*Example No. 9*

5 pounds of the same ground and air-dried yellow corn were added to a vessel containing 1.2 gallons of water. 8 cc. of 85% of phosphoric acid was added to the corn mash to obtain a pH 3.8 at 25° C. after twenty minutes. The corn mash was continuously mixed while in the vessel.

The temperature of the mash was then raised to 63.5° C. This temperature was maintained for a period of ninety minutes. The mash was then transferred to a centrifuge to reduce the liquid content. The centrifugate was transferred to a dehydrator maintained at 100° C. for a period of twenty-five minutes. The corn meal was then removed from the dehydrator and it was determined that the moisture content had been reduced to approximately 12%. The pH of the corn meal was adjusted with calcium hydroxide to approximately pH 6.5 and the corn meal was again dehydrated until the moisture content was approximately 12%. If sodium phosphate had been desired, the pH adjustment would have been effected with sodium hydroxide.

TABLE B

|  | Example No. 4 | Example No. 5 | Example No. 6 | Example No. 7 | Example No. 8 | Example No. 9 |
|---|---|---|---|---|---|---|
| Starch Content_____percent__ | 69.887 | 63.632 | 62.678 | 62.705 | 63.500 | 67.843 |
| Reducing Sugars and Short Chain Dextrins percent__ | .214 | 6.95 | 8.01 | 7.980 | 7.097 | 2.272 |
| Total Carbohydrates_____do____ | 70.101 | 70.582 | 70.688 | 70.685 | 70.597 | 70.115 |
| Amylose R$p$A_____ | 194.75 | 722.11 | 820.13 | 805.10 | 700.31 | 466.75 |
| Amylopectin R$p$A_____ | 302.50 | 147.70 | 144.425 | 138.40 | 114.19 | 186.50 |
| R. C. V._____ |  | 682.16 | 783.46 | 774.45 | 693.87 | 388.0 |

*Example No. 7*

12½ pounds of the same air-dried and ground yellow corn was added to a vessel containing 3 gallons of water. The corn mash was continuously mixed while in the vessel. 8.58 liquid ounces of 6 normal sodium hydroxide was slowly added to the mash to obtain a pH 10.7 at 25° C. after twenty minutes. The temperature of the mash was then raised to 63° C. This temperature was maintained for a period of ninety minutes. The mash was then transferred to a centrifuge to reduce the liquid content. The centrifugate was transferred to a de- A comparison of Examples Nos. 5 and 6 shows the increase in hydrolytic cleavage that is effected in the dehydrator, when the pH of the mass is not adjusted before it is transferred to the dehydrator, the dehydrator is maintained at temperatures of approximately 100° C. or more, and the material is maintained in the dehydrator for a sufficient period of time. Examples Nos. 7 and 8 show the advantage of increased temperature while the material is being treated with the catalyst. Example No. 9 shows that certain desirable phosphate salts can be produced in the treated material when phosphoric acid is used as the catalyst.

Examples Nos. 11 and 12 are examples of the use of my invention to increase the digestibility of air-dried white rice. The white rice in Example No. 10 was not processed by my invention, but this example was made for the purposes of comparison. White rice from the same lot was used in each example and in each example the white rice was ground in a Buhr stone mill to pass through a sieve having .54 mm. openings. The results of Examples Nos. 10, 11 and 12 are given in the Table C following Example No. 12. The products of Examples Nos. 11 and 12 are suitable for human consumption, and the product of Example No. 12, in particular, is suitable for infants and invalids. The product is particularly useful in the preparation of gruels, custards, puddings, and other soft diet foods.

Example No. 10

15 pounds of air-dried and ground white rice were added to a vessel containing 3.6 gallons of water. The mass was continuously mixed while in the vessel by means of a mechanical stirrer and a circulating pump. The mass was mixed at room temperature for a period of twenty minutes after which the temperature was raised to 68° C. and maintained at that temperature for a period of ninety minutes. The mass was then pumped to a centrifuge and the excess water was removed. The centrifugate was then transferred to a dehydrator maintained at 68° C. for a period of ninety minutes. The moisture content of the thus dehydrated rice was reduced to approximately 12%.

Example No. 11

10 grams of the same air-dried and ground white rice was added to a vessel containing 39.88 cc. of approximately .25 normal potassium hydroxide. The mass was continuously mixed while in the vessel. After twenty minutes the pH of the mass was equivalent to pH 12.80 at 25° C. 7.8 cc. of one-sixth strength commercial hydrochloric acid (31.45% HCl, 20° Bé.) was then added to the mass which made an adjustment equivalent to pH 5.96 at 25° C. A pH between pH 5.5 and 6.5 is the optimum pH value for the amylose of micro-biological enzyme diastatic reaction in instances in which the enzymes are of *B. subtilis* origin.

78 mg. of this enzyme was then added to the mass, which amount is equal to 1% of the starch content of the rice (the starch content of the rice being approximately 78.05%).

The temperature of the mass was then raised to 68° C. This temperature was maintained for a period of ninety minutes. The mass was then transferred to a centrifuge to reduce the liquid content. The centrifugate was transferred to a dehydrator maintained at 100° C. where it remained for a period of thirty minutes. The moisture content of the rice was found to have been reduced approximately 12%.

Any of the bases or basic salts suitable for my process may be used instead of potassium hydroxide and any acid suitable for my process may be used instead of hydrochloric acid.

Example No. 12

In a modification of my process, after the mass is treated with the enzyme, and before the mass is transferred to a centrifuge, the mass is treated with hydrochloric acid to effect additional hydrolytic cleavage. 10 grams of the same air-dried white rice was treated in the same manner as described in Example No. 11, except that after the mass was treated with the enzyme, .125 cc. of approximately ⅙ strength hydrochloric acid (31.45% HCl, 20° Bé.) was added to the mass which made a pH adjustment equivalent to pH 3.3 at 25° C. The mass was maintained at 68° C. for fifteen minutes after which it was transferred to a centrifuge and the treatment continued in accordance with Example No. 11.

Food materials processed in accordance with this example have greatly enhanced hydrolytic cleavage with respect to those treated as set forth in Example 11.

The purpose of processing enzymatically in conjunction with acids or bases is that while enzymatic processes without additional acid or basic treatment definitely increases the digestibility of the starch carbohydrate, such processes, when followed by acid or basic treatment effect additional desirable cleavage in that the acids or bases attack indigestible glucosans containing the alpha 1,6-glucosidic linkages of the saccharides.

TABLE C

| | Example No. 10 | Example No. 11 | Example No. 12 |
|---|---|---|---|
| Starch_____percent__ | 77.23 | 70.14 | 69.72 |
| Reducing Sugars and Short Chain Dextrins_____percent__ | {.63, .19} .82 | 7.87 | {2.11, 6.24} 8.35 |
| Total Carbohydrates___do____ | 78.05 | 78.01 | 78.07 |
| Amylose RpA_____ | 851.0 | 1,021.2 | 1,372.56 |
| Amylopectin RpA_____ | 182.0 | 135.71 | 105.56 |
| R. C. V_____ | | 216.49 | 598.07 |

Examples Nos. 14, 15, 16, 17, 18, 19, and 20 are examples of the use of my invention to increase the digestibility of corn starch. The corn starch in Example No. 13 was not processed by my invention, but this example was made for comparative purposes. Corn starch from the same lot was used in each instance. The results of these examples are given in the Table D following Example No. 20. The products of Examples Nos. 14, 15, 16, 17, 18, 19 and 20 are suitable for human consumption. The products of Examples Nos. 14, 15, 16, 18 and 19 are particularly useful for their digestibility and nutritional values in the preparation of custards, puddings and other soft diet foods for infants and invalids.

Example No. 13

12½ pounds of raw corn starch was added to a vessel containing 2.8 gallons of water. The starch slurry was continuously mixed while in the vessel by means of a mechanical mixer and a circulating pump.

The temperature of the starch slurry was raised to 63° C. and maintained at that temperature for ninety minutes. The starch slurry was then pumped to a centrifuge and the excess water extracted. The centrifugate was then transferred to a dehydrator maintained at 60° C. for twenty minutes. The mass was then transferred from the dehydrator and it was determined that the moisture content had been reduced to approximately 10%.

Example No. 14

12½ pounds of the same raw corn starch was added to a vessel containing 2.8 gallons of water. The starch slurry was continuously mixed while in the vessel by means of a mechanical mixer and a circulating pump. 1.66 liquid ounces of one-sixth strength commercial hydrochloric acid (31.46% HCl, 20° Be.') was slowly added to the slurry to obtain a pH equivalent to pH 3.3 at 25° C. after twenty minutes.

The temperature of the mass was raised to 63° C. and maintained at that temperature for a period of fifteen minutes. The pH of the starch was then checked and found to be equivalent to pH 3.4 at 25° C. An adjustment was made equivalent to pH 5.4 at 25° C. with the addition of 6 Normal sodium hydroxide. The mass was then transferred to a centrifuge to reduce the liquid content. The centrifugate was then transferred to a dehydrator maintained at 60° C. for a period of twenty minutes. The mass was then transferred from the dehydrator and its was determined that the moisture content had been reduced to approximately 10%.

Example No. 15

12½ pounds of the same raw corn starch was treated in the same manner as described in Example 14, except that the slurry was maintained in the vessel at a temperature of 63° C. for a period of ninety minutes. The pH of the starch after this period of time was checked and found to be equivalent to pH 3.45 at 25° C. An adjustment was made equivalent to pH 5.4 at 25° C. with the addition of 6 Normal sodium hydroxide.

Example No. 16

12½ pounds of the same raw corn starch was treated in the same manner as described in Example No. 15, except that the starch was treated in the dehydrator for a period of fifteen minutes and that the dehydrator was maintained at a temperature of 100° C.

Example No. 17

10 pounds of the same raw corn starch was added to a vessel containing 2.4 gallons of water. The starch slurry was continuously mixed while in the vessel. 4.516 liquid ounces of 6 Normal sodium hydroxide was slowly added to the slurry to obtain a pH equivalent to pH 10.7 at 25° C. after twenty minutes. The temperature of the mass was then raised to 63° C. and maintained at that temperature for a period of ninety minutes. The pH of the starch was then checked and found to be equivalent to pH 9.4 at 25° C. An adjustment was made equivalent to pH 5.4 at 25° C. with the addition of ⅕ strength commercial hydrochloric acid (31.45%, 20° Be.'). The mass was then transferred to a centrifuge to reduce the liquid content. The centrifugate was transferred to a dehydrator maintained at 69° C. for a period of twenty minutes. The starch was then removed from the dehydrator and it was determined that the moisture content had been reduced to approximately 10%.

Example No. 18

10 pounds of the same raw corn starch was treated in the same manner as described in Example No. 17, except that the pH of the mass was not adjusted before the mass was transferred to the dehydrator, that the mass was treated in the dehydrator for a period of fifteen minutes, that the dehydrator was maintained at a temperature of 100° C., that the pH of the starch from the dehydrator was then adjusted to pH 6.0 by spraying the starch with dilute hydrochloric acid, and that the treated starch was then dehydrated to a moisture content of approximately 10%.

Example No. 19

5 pounds of the same raw corn starch was added to a vessel containing 1.2 gallons of water. The starch slurry was continuously mixed while in the vessel. 15.65 liquid ounces of .5 normal potassium hydroxide was slowly added to the slurry to obtain a pH equivalent to pH 10.7 at 25° C. after twenty minutes. The temperature of the mass was then raised to 63° C. and maintained at that temperature for a period of ninety minutes. The mass was then transferred to a centrifuge to reduce the liquid content. The centrifugate was transferred to a dehydrator maintained at 100° C. for a period of twelve minutes. The pH of the starch from the dehydrator was then adjusted to pH 6.0 by spraying the starch with dilute hydrochloric acid and the starch was then dehydrated to a moisture content of approximately 10%.

Example No. 20

12 pounds of the same raw corn starch was added to a vessel containing 3.6 gallons of water in which had been dissolved 209.40 grams of sodium hydroxide. The starch slurry was continuously mixed while in the vessel. After twenty minutes the pH of the slurry was equivalent to pH 11.2 at 25° C. The gravity of the starch slurry was 38° Be'. After the twenty minute mixing period considerable solution of the corn starch was effected. 35.03 ounces of 25% commercial hydrochloric acid (31.45% HCl, 20° Be.') was then added to the slurry which made an adjustment equivalent to pH 6.0 at 25° C. A pH between 5.5 and 6.5 is the optimum pH value for the microbiological enzymatic reaction in instances in which the micro-biological enzymes are of *Aspergillus oryzae* origin.

27.22 grams of this enzyme was then added to the slurry, which amount is equal to ½ of 1% of the weight of the starch.

The temperature of the mass was then raised to 65° C. and maintained at that temperature for a period of ninety minutes. The mass was then transferred to a centrifuge to reduce the liquid content. The centrifugate was transferred to a dehydrator maintained at 100° C. for seventeen minutes. The starch was then transferred from the dehydrator and it was determined that the moisture content had been reduced to approximately 10%.

Starch treated in accordance with this example may be rendered even more digestible and nutritious by further treating the starch with an acid, base, or basic salt after the treatment with the enzyme, similar to the process outlined in Example No. 12.

TABLE D

| | Example No. 13 | Example No. 14 | Example No. 15 | Example No. 16 | Example No. 17 | Example No. 18 | Example No. 19 | Example No. 20 |
|---|---|---|---|---|---|---|---|---|
| Starch_____percent__ | 93.600 | 87.216 | 86.408 | 86.332 | 88.108 | 86.459 | 86.594 | 88.321 |
| Reducing Sugars and Short Chain Dextrins____percent__ | 0.00 | 7.093 | 7.991 | 8.076 | 6.102 | 7.934 | 7.784 | 5.865 |
| Total Carbohydrates percent__ | 93.600 | 94.309 | 94.399 | 94.408 | 94.210 | 94.393 | 94.378 | 94.186 |
| Amylose RpA_____ | 963.44 | 1,260.19 | 1,311.49 | 1,410.00 | 1,247.50 | 1,332.50 | 1,322.40 | 1,144.13 |
| Amylopectin RpA_____ | 267.18 | 200.12 | 179.78 | 178.18 | 265.58 | 205.30 | 207.10 | 182.18 |
| R. C. V_____ | | 363.81 | 435.45 | 535.56 | 285.66 | 430.94 | 419.04 | 265.69 |

A comparison of Examples Nos. 14 and 15 shows the increase in hydrolytic cleavage that is effected when the material is treated with the catalyst for longer periods of time.

A comparison of Examples Nos. 15 and 16 shows the increase in hydrolytic cleavage that is effected in the dehydrator when the pH of the material is not adjusted before the material is transferred to the dehydrator, and the dehydrator is maintained at temperatures of approximately 100° C. or more.

A comparison of Examples Nos. 17 and 18 shows the increase in hydrolytic cleavage that is effected in the dehydrator when the pH of the material is not adjusted before the material is transferred to the dehydrator and the dehydrator is maintained at temperatures of 100° C. or more.

Any of the food materials mentioned on page 5 may be treated by processes similar to those described in Examples Nos. 1, 2, 5, 6, 7, 8, 9, 11, 12, 14, 15, 16, 17, 18, 19 and 20.

Any of the acids, bases, basic salts and enzymes mentioned in column 3, lines 25–40, inclusive, may be used in the processes of my invention. However, instead of using nitric acid alone, I prefer to use nitric acid in combination with another acid. Of course, any combination of said acids, or combination of said bases and basic salts may be used, for example, a combination of hydrochloric acid and phosphoric acid.

From the foregoing descriptions, the uses and advantages of my invention will be readily understood by those skilled in the art in which the invention pertains. While I have described the principle of my invention, I desire to have it understood that the examples given are merely illustrative and that the invention is not to be limited to the details disclosed herein, but is to be accorded the full scope of the appended claims.

I claim:

1. A process for the production from corn and potatoes of a product useful as an animal food and suitable as the main carbohydrate diet of animals having difficulty in assimilating unmodified starch which comprises comminuting a material selected from the group consisting of corn and potatoes, mixing said comminuted material with water, heating the mixture so formed at an elevated temperature below the gelatinization temperature of said starch in said material to substantially hydrolyze said starch and produce a solid starch hydrolysate substantially more water-soluble than said starch and comprising essentially glucosans and saccharides of lower molecular weight than said starch, said hydrolysate containing not more than 20% by weight of reducing sugars, separating the hydrolysate-containing solid phase from the hydrolysis reaction mixture, and drying the solid phase so separated.

2. A process for the production from corn and potatoes of a product useful as an animal food and suitable as the main carbohydrate diet of animals having difficulty in assimilating unmodified starch which comprises comminuting a material selected from the group consisting of corn and potatoes, mixing said comminuted material with aqueous hydrochloric acid, heating the mixture so formed at an elevated temperature below the gelatinization temperature of said starch in said material to substantially hydrolyze said starch and produce a solid starch hydrolysate substantially more water-soluble than said starch and comprising essentially glucosans and saccharides of lower molecular weight than said starch, said hydrolysate containing not more than 20% by weight of reducing sugars, separating the hydrolysate-containing solid phase from the hydrolysis reaction mixture, and drying the solid phase so separated.

3. A process for the production from corn and potatoes of a product useful as an animal food and suitable as the main carbohydrate diet of animals having difficulty in assimilating unmodified starch which comprises comminuting a material selected from the group consisting of corn and potatoes, mixing said comminuted material with water, heating the mixture so formed at an elevated temperature below the gelatinization temperature of said starch in said material to substantially hydrolyze said starch to produce a first solid starch hydrolysate, separating the first hydrolysate-containing solid phase from the first hydrolysis reaction mixture and heating the separated first hydrolysate to effect further hydrolysis thereof and produce a second hydrolysate substantially more water-soluble than the original starch, comprising essentially glucosans and saccharides of lower molecular weight than starch and containing not more than about 20% of reducing sugars, and dehydrating said second hydrolysate.

4. The process of claim 3 wherein the first hydrolysate is simultaneously heated and dehydrated to produce the second hydrolysate.

5. The process for the production from starch of a material suitable as an animal food and assimilable by animals having difficulty in assimilating unmodified starch which comprises forming a mixture of starch and water, heating the mixture so formed at an elevated temperature below the gelatinization temperature of the starch to substantially hydrolyze said starch and produce a starch hydrolysate substantially more water-soluble than the original starch comprising essentially glucosans and saccharides of lower molecular weight than the starch, said hydrolysate containing not more than 20% by weight of reducing sugars, separating the hydrolysate-containing solid phase from the hydrolysis reaction mixture and drying the solid phase so separated.

References Cited in the file of this patent

UNITED STATES PATENTS

| 746,933 | Duryea | Dec. 15, 1903 |
| 1,110,754 | Duryea | Sept. 15, 1914 |
| 1,366,653 | Harvey | Jan. 25, 1921 |
| 1,391,065 | Lenders | Sept. 20, 1921 |
| 1,733,574 | Block | Oct. 29, 1929 |
| 1,901,109 | Maier | Mar. 14, 1933 |
| 2,148,016 | Gale | Feb. 21, 1939 |
| 2,190,063 | Gano | Feb. 13, 1940 |

FOREIGN PATENTS

| 526,474 | Great Britain | Sept. 19, 1940 |
| 564,377 | Great Britain | Sept. 26, 1944 |

OTHER REFERENCES

Morrison: Feeds and Feeding, 21st ed. The Morrison Pub. Co., Ithaca, New York, 1948, p. 631.